United States Patent
Krumrine, III et al.

(10) Patent No.: US 10,024,500 B2
(45) Date of Patent: Jul. 17, 2018

(54) USE OF METAL SILICIDES IN HYDROCARBON PRODUCTION AND TRANSPORTATION

(71) Applicant: SIGNA CHEMISTRY, INC., New York, NY (US)

(72) Inventors: Paul H. Krumrine, III, Hanover, PA (US); James S. Falcone, Jr., Palm Beach Gardens, FL (US); Michael Lefenfeld, New York, NY (US)

(73) Assignee: SIGNA CHEMISTRY, INC., New York, NY (US)

( * ) Notice: Subject to any disclaimer, the term of this patent is extended or adjusted under 35 U.S.C. 154(b) by 0 days.

(21) Appl. No.: 15/672,495

(22) Filed: Aug. 9, 2017

(65) Prior Publication Data

US 2017/0336032 A1    Nov. 23, 2017

Related U.S. Application Data

(62) Division of application No. 15/586,691, filed on May 4, 2017, now Pat. No. 9,791,108, which is a division
(Continued)

(51) Int. Cl.
*E21B 43/267* (2006.01)
*C02F 1/42* (2006.01)
(Continued)

(52) U.S. Cl.
CPC .............. *F17D 3/12* (2013.01); *B08B 7/0071* (2013.01); *B08B 9/055* (2013.01); *E21B 37/06* (2013.01);
(Continued)

(58) Field of Classification Search
CPC ....... E21B 43/26; C02F 1/42; C02F 2001/425
See application file for complete search history.

(56) References Cited

U.S. PATENT DOCUMENTS

| 3,097,694 A | 7/1963 | Kerver |
|---|---|---|
| 3,482,636 A | 12/1969 | Crowe |

(Continued)

FOREIGN PATENT DOCUMENTS

| CN | 101395340 A | 3/2009 |
|---|---|---|
| WO | 2007/098606 A1 | 9/2007 |
| WO | 2012174255 A1 | 12/2012 |

OTHER PUBLICATIONS

International Search Report and Written Opinion in PCT Application No. PCT/US2013/047665 dated Jan. 29, 2014.
(Continued)

*Primary Examiner* — William D Hutton, Jr.
*Assistant Examiner* — Avi T Skaist
(74) *Attorney, Agent, or Firm* — J.A. Lindeman & Co., PLLC

(57) ABSTRACT

A method of hydraulic fracturing is provided which uses metal silicides to generate significant pressure inside a wellbore. The method comprises injecting a fracturing fluid and an aqueous or reacting fluid into the wellbore to react with the fracturing fluid. The fracturing fluid comprises metal silicide, which may be uncoated or coated, and hydrocarbon fluid. The reacting fluid comprises water or a solvent. A method of removing buildup in pipelines such as subsea pipelines which uses metal silicides to generate heat and pressure inside the pipeline is also provided. The method comprises injecting an organic slug and an aqueous slug. The organic slug comprises metal silicide and hydrocarbon fluid. The aqueous slug comprises water. Alternatively, there is also provided a method for purifying flowback water produced from a hydraulic fracturing process comprising adding metal silicide to the flowback water produced from a hydraulic fracturing process.

4 Claims, 4 Drawing Sheets

Related U.S. Application Data of application No. 13/926,891, filed on Jun. 25, 2013, now Pat. No. 9,677,392.

(60) Provisional application No. 61/663,880, filed on Jun. 25, 2012.

(51) Int. Cl.

| | |
|---|---|
| *F17D 3/12* | (2006.01) |
| *B08B 9/055* | (2006.01) |
| *F16L 58/00* | (2006.01) |
| *E21B 37/06* | (2006.01) |
| *B08B 7/00* | (2006.01) |
| *F16L 101/12* | (2006.01) |
| *E21B 43/24* | (2006.01) |
| *E21B 43/26* | (2006.01) |

(52) U.S. Cl.
CPC ........... *F16L 58/00* (2013.01); *E21B 43/2405* (2013.01); *E21B 43/26* (2013.01); *E21B 43/267* (2013.01); *F16L 2101/12* (2013.01)

(56) References Cited

U.S. PATENT DOCUMENTS

| | | | |
|---|---|---|---|
| 3,690,376 | A | 9/1972 | Zwicky et al. |
| 3,707,386 | A | 12/1972 | Kurz |
| 3,804,643 | A | 4/1974 | Arita et al. |
| 3,826,658 | A | 7/1974 | Nicholas |
| 4,020,027 | A | 4/1977 | Nicholas et al. |
| 4,085,799 | A | 4/1978 | Bousaid et al. |
| 4,147,615 | A | 4/1979 | Leas |
| 4,718,490 | A | 1/1988 | Uhri |
| 4,755,230 | A | 7/1988 | Ashton et al. |
| 5,063,967 | A | 11/1991 | Stephens |
| 5,083,615 | A | 1/1992 | McLaughlin et al. |
| 5,343,941 | A | 9/1994 | Raybon |
| 5,402,846 | A | 4/1995 | Jennings et al. |
| 5,639,313 | A | 6/1997 | Khalil |
| 6,003,528 | A | 12/1999 | De Souza et al. |
| 6,169,058 | B1 | 1/2001 | Le et al. |
| 6,224,793 | B1 | 5/2001 | Hoffman |
| 6,929,865 | B2 | 8/2005 | Myrick |
| 6,981,548 | B2 | 1/2006 | Wellington et al. |
| 7,111,683 | B2 | 9/2006 | Nelson et al. |
| 7,624,743 | B2 | 12/2009 | Sarkar et al. |
| 7,740,068 | B2 | 6/2010 | Ballard |
| 7,926,567 | B2 | 4/2011 | Harris et al. |
| 7,946,342 | B1 | 5/2011 | Robertson |
| 8,007,762 | B2 | 8/2011 | Lefenfeld et al. |
| 8,372,371 | B2 | 2/2013 | Lefenfeld et al. |
| 8,962,536 | B2 | 2/2015 | Winslow et al. |
| 9,067,807 | B2 * | 6/2015 | Soane .................. C02F 1/28 |
| 2003/0141064 | A1 | 7/2003 | Roberson, Jr. |
| 2006/0002839 | A1 | 1/2006 | Lefenfeld et al. |
| 2010/0139924 | A1 | 6/2010 | Abney |
| 2010/0316917 | A1 | 12/2010 | Lefenfeld et al. |
| 2012/0037368 | A1 | 2/2012 | Eick et al. |
| 2013/0068462 | A1 | 3/2013 | Pantano |
| 2014/0144841 | A1 * | 5/2014 | Boileau .................. C02F 1/28 210/679 |
| 2016/0339446 | A1 * | 11/2016 | Blasberg ............ B01D 15/3885 |

OTHER PUBLICATIONS

A. Wallace, Signa Chemistry, Inc. "Commercialization of Portable Hydrogen [Presentation]," Fuel Cell Seminar, Nov. 2011 [retrieved Oct. 27, 2013]. Retrieved from the Internet: <URL: http://www.fuelcellseminar.com/media/9030/com34-5%20wallace.pdf>; slides 4-5.
International Preliminary Report on Patentability in PCT Application No. PCT/US2013/047665 dated Dec. 31, 2014.
International Search Report of PCT Application No. PCT/US2012/042477 dated Oct. 15, 2012.
International Preliminary Report on Patentability of PCT Application No. PCT/US2012/042477 dated Mar. 25, 2014.
International Search Report of PCT Application No. PCT/US2012/042482 dated Sep. 7, 2012.
International Preliminary Report on Patentability of PCT Application No. PCT/US2012/042482 dated Dec. 17, 2013.
SIGNA Silicides for Oil Field Applications, in Office Action for U.S. Appl. No. 13/926,891, dated Aug. 7, 2015.
Donald O. Whittemore, "Water Quality and Hydraulic Fracturing", Kansas Geological Survey, Nov. 3, 2011.
STIC Search, in Office Action for U.S. Appl. No. 13/926,891, dated Nov. 27, 2015.
Borchardt, John K. : "In-Situ Gelation of Silicates in Drilling, Well Completion and Oil Production, Shell Development Company," Westhollow Research Center, Houston, Tx.
Cole et al.: "Water Control for Enhanced Oil Recovery," Halliburton Services, Society of Petroleum Engineers of AIME, 1981.
Hower et al.: "Selective Plugging of Injection Wells by In Situ Reactions," Paper presented at Secondary Recovery Symposium in Wichita Falls, Tx, Nov. 19-20, 1956.
Krumrine et al.: "Profile Modification and Water Control With Silica Gel-Based Systems," Society of Petroleum Engineers, Paper presented at the International Symposium on Oilfield and Geothermal Chemistry held in Phoenix, Arizona, Apr. 9-11, 1985.
Resnvold et al.: "Recompletion of Wells to Improve Water-Oil Ratio," Society of Petroleum Engineers, Paper presented at regional meeting Apr. 2-4, 1975.
Singh et al.: "Fused Chemical Reactions: The Use of Dispersion to Delay Reaction Time in Tubular Reactors," Ind. Eng. Chem. Res., vol. 37, pp. 2203-2207, 1998.
Smith et al.: "A Special Selant Process for Subsurface Water Production," Society of Petroleum Engineers, Paper presented at 1978 Rocky Mountain Regional Meeting Apr. 20-21, 1978.
Usaitis, Vytautas: "Laboratory Evaluation of Sodium Silicate for Zonal Isolation," Master's Thesis, University of Stavanger, Stavanger, Norway, Jun. 30, 2011.
Vinot et al.: "Formations of Water-Soluble Silicate Gels by the Hydrolysis of a Diester of Dicarboxylic Acid Solubized as Microemulsions," Paper presented at 60th Annual Technical Conference and Exhibition of the Society of Petroleum Engineers held in Las Vegas, NV Sep. 22-25, 1985.
SIGNA Chemistry, Material Safety Data Sheet—Sodium Silicide (2008).

\* cited by examiner

USE OF METAL SILICIDES IN HYDROCARBON PRODUCTION AND TRANSPORTATION

This application is a divisional application of U.S. patent application Ser. No. 15/586,691, filed on May 4, 2017, which is a divisional application of U.S. patent application Ser. No. 13/926,891, filed on Jun. 25, 2013, now U.S. Pat. No. 9,677,392, which claims priority to U.S. Provisional Application No. 61/663,880, filed Jun. 25, 2012, the contents of all of which are incorporated herein by reference in their entirety.

FIELD OF THE INVENTION

This invention relates to a new and improved hydraulic fracturing operation using metal silicides to generate significant pressure in a wellbore. The metal silicide may be an alkali metal silicide or another metal silicide.

This invention also relates to a method that will simplify the treatment/disposal, or recycling, of the flowback waters produced during the hydraulic fracturing process with the use of metal silicides. The metal silicide may be an alkali metal silicide or another metal silicide.

This invention also relates to a new and improved method for removing the buildup of asphaltene and/or waxy deposits in a pipeline (such as a subsea pipeline) using metal silicides. The metal silicide may be an alkali metal silicide or another metal silicide.

BACKGROUND OF THE INVENTION

Hydraulic Fracturing

Hydraulic fracturing is a well-known process used to recover hydrocarbon fluids such as gases (e.g., natural gas) or liquids (e.g., oil or petroleum) that are otherwise trapped or present in the pores of underground formations. At its most basic level, hydraulic fracturing involves the creation of fractures (e.g., cracks, fissures, etc.) in rock, or underground formations, which will allow hydrocarbon fluids to flow toward a production well. That is, hydraulic fracturing of subterranean formations (sometimes referred to as fracking), provides a pathway for hydrocarbon fluids to more easily move through tight low permeability (micro Darcy) formations (e.g., shale, certain clay sandstones, limestones, etc.) to a production well.

Once a hole is properly drilled for extracting hydrocarbon fluids (i.e., a "wellbore"), fracturing fluids are injected under high pressure into a wellbore to produce fractures that will enhance the flow of hydrocarbon fluids trapped in the subterranean formation. These fracturing fluids typically include a proppant, which is a solid material such as rounded sand grains, bauxite or ceramics that function to "hold" the newly created fractures open after the fracturing pressure is relieved so that the hydrocarbon fluids trapped in the subterranean formation may flow to the intended production well. That is, these "propped fractures" serve as pathways linking a greater proportion of the interior depths of the formation containing the trapped hydrocarbon fluids directly to a production well.

Alternatively, hydraulic fracturing can also involve the injection of prepad, pad and proppant slugs into a properly prepared wellbore under very high pressure.

In either scenario, the key to hydraulic fracturing is the application of high pressure to create fractures in the formation's pay zone (the zone containing the gases and/or liquids) that is then filled with proppant materials to prevent its complete closure after removal of the applied pressure. Sufficient pressure must be applied to exceed the overburden confining pressure of the rock formations above the pay zone.

Once the fractures have been created, a flush fluid is subsequently injected to break gels and sweep residual materials from the wellbore in preparation for hydrocarbon production. As a result, large amounts of fresh or clean water are often required in hydraulic fracturing. Indeed, water management is a serious concern during hydraulic fracturing operations—a single well with multi-stage fracturing may require several million gallons of relatively fresh water to complete the operation in a long horizontal lateral. In arid areas or anywhere where water resources are scarce due to other existing public and commercial needs, acquiring and transporting sufficient water can be a challenge and impose a significant cost consideration.

In addition, after a hydraulic fracturing or stimulation operation is complete, the water used/recovered (i.e., "flowback" or "back flow" water) often contains high levels of total suspended solids (TSS) and total dissolved solids (TDS) with multi-valent cations such as Ca, Mg, Fe, Al, Sr, Ba, Ra, etc. picked up from the formation as well as residual amounts of the chemicals initially added to perform the hydraulic fracturing process. This water must be treated and/or properly disposed, and/or cleaned up sufficiently so that it can be recycled for use in subsequent stimulation jobs on nearby wells. As such, water impurity levels are also a concern in hydraulic fracturing processes.

In an effort to address these water concerns, foamed hydraulic fracturing gained commercial acceptance in the early 1970's, and is used in up to one third of current fracturing applications. In a foamed hydraulic fracturing process, gases such as carbon dioxide ($CO_2$) and nitrogen ($N_2$) are used with appropriate surfactants, polymers and crosslinking agents to create stable highly viscous foams to assist in transporting proppants into the fractures. High quality foams (>60%) can help reduce the amount of water that is required to complete a fracturing operation. In addition, the use of foams also reduces exposure of sensitive formations to water that could result in clay swelling, or plugging. Foams contribute to faster flowback and make cleanup of the formation and wellbore easier in preparation for production.

However, an issue with foams is that they are shear thinning non-Newtonian fluids and thus, the viscosity of the foamed fluid falls off significantly with shear rate. Therefore, the high fluid shear rates associated with high liquid injection rates can lead to elevated leakage of the foam into existing cracks and fissures, making such foams less effective in propagating fractures into new areas. For this reason, foams are generally limited to only very tight formations. Higher mesh sands are often used to compensate for this which, however, results in lower ultimate productivity. Also, foams are best at suspending low concentrations of proppants, and consequently yield narrower propped fractures once the pressure is relieved. As such, foamed hydraulic fracturing often results in less overall productivity than traditional liquid ("slickwater" or gelled) hydraulic fracturing techniques.

Therefore, there remains a need for an improved hydraulic fracturing method which will reduce the amount of water required and reduce the amount of back flow impurities while maintaining a high level of hydrocarbon fluid production.

Pipelines

Over time, asphaltene deposits and/or waxy deposits have been known to buildup in hydrocarbon fluid pipelines as a result of low temperatures making them less soluble in the native hydrocarbon fluid. The buildup of these deposits can result in a reduced flow of the hydrocarbon fluid. In situations in which the pipeline is hard to reach, this can make the removal of these deposits difficult.

For example, subsea pipelines are pipelines that are laid down on the bottom of the sea or ocean bed to transport hydrocarbon fluids such as crude oil from offshore platforms to on-shore collection facilities. Due to the relatively low subsea temperatures and the use of un-insulated pipes being often employed, there is a tendency for waxy, or asphaltene, materials contained in the crude oil to precipitate out of solution and deposit on pipeline walls. Over time, this buildup can slow flow reducing operating efficiency, or even eventually block the pipeline. The location of the subsea pipeline at the bottom of the sea/ocean makes it very difficult to remove or clean up the buildup of asphaltene or waxy deposits.

The conventional method used to clean subsea or conventional pipelines have been the use of pipeline intervention gadgets (or devices) also known as "pigs" to mechanically clean the pipeline. However, pigs require pipelines of constant diameter just larger than the pig itself and the pipeline cannot contain any mechanical obstructions or certain types of valves (such as butterfly valves or reduced portball valves) that would obstruct the pig from moving through the pipeline.

As such, there is a need for an improved method to reduce the buildup of asphaltene or waxy deposits in subsea or conventional pipelines.

SUMMARY OF THE INVENTION

It has been found that the problems of the hydraulic fracturing prior art can be solved by using metal silicides. That is, the use of a metal silicide can generate significant pressures necessary to conduct a hydraulic fracturing operation while at the same time reducing water consumption and impurities. Metal silicides can also be used to generate heat and an alkaline environment (especially when alkali metal silicides are used) which further improves hydraulic fracturing operations. The metal silicide may be an alkali metal silicide or another metal silicide.

In one embodiment of the present invention, there is provided a method of hydraulic fracturing comprising injecting a fracturing fluid into a wellbore, said fracturing fluid comprising at least 10% proppant, at least 5% metal silicide, and hydrocarbon fluid; and injecting an aqueous fluid comprising water into said wellbore, wherein said metal silicide reacts with said water to generate a pressure of at least 1,000 psig in said wellbore. The metal silicide may be an alkali metal silicide or another metal silicide.

In another embodiment of the present invention, there is provided a method of hydraulic fracturing comprising injecting a metal silicide loaded fracturing fluid into a wellbore, said metal silicide loaded fracturing fluid comprising at least 20% metal silicide and hydrocarbon fluid; injecting a proppant loaded fracturing fluid into said wellbore, said proppant loaded fracturing fluid comprising at least 10% proppant and hydrocarbon fluid; and injecting an aqueous fluid comprising water into said wellbore, wherein said metal silicide reacts with said water to generate a pressure of at least 1,000 psig in said wellbore. The metal silicide may be an alkali metal silicide or another metal silicide.

In another embodiment of the present invention, there is provided a method of hydraulic fracturing comprising injecting a metal silicide loaded fracturing fluid into a wellbore, said metal silicide loaded fracturing fluid comprising at least 20% metal silicide and hydrocarbon fluid; injecting a spacer slug comprising hydrocarbon fluid into the wellbore; injecting a proppant loaded fracturing fluid into said wellbore, said proppant loaded fracturing fluid comprising at least 10% proppant and water; and injecting an aqueous fluid comprising water into said wellbore; wherein said spacer slug is injected in between the metal silicide loaded fracturing fluid and the proppant loaded fracturing fluid; and wherein said metal silicide reacts with water to generate a pressure of at least 1,000 psig in said wellbore. The metal silicide may be an alkali metal silicide or another metal silicide.

In another embodiment of the present invention, there is provided a method of hydraulic fracturing comprising injecting a fracturing fluid into a wellbore, the fracturing fluid comprising at least 10% proppant, at least 5% metal silicide composition, said metal silicide composition comprising metal silicide encapsulated in a water insoluble coating, and a liquid carrier; and injecting a reacting fluid into the wellbore to remove the water insoluble coating on the metal silicide composition and react with said metal silicide to generate a pressure of at least 1,000 psig in the wellbore. The metal silicide may be an alkali metal silicide or another metal silicide.

It has also been found that the problems of removing asphaltene or waxy deposit buildups in a pipeline (such as a subsea pipeline) can be solved by using metal silicides such as alkali metal silicides. That is, metal silicide compositions can be used to generate significant heat necessary in a cold ocean/sea environment to melt and resolubilize the asphaltene or waxy deposit in the pipeline. Metal silicides can also be used to generate heat and an alkaline environment (especially when alkali metal silicides are used) which further improves hydraulic pipeline flow restoration. The metal silicide may be an alkali metal silicide or another metal silicide.

In an embodiment of the present invention, there is provided a method for removing buildup of asphaltene or waxy deposits in pipelines (such as subsea pipelines) comprising injecting an organic slug into a pipeline, said organic slug comprising at least 10% metal silicide and hydrocarbon fluid; injecting an aqueous slug comprising water into said pipeline, wherein said metal silicide reacts with said water in said pipeline to generate heat and pressure for removing the buildup of asphaltene or waxy deposit. The metal silicide may be an alkali metal silicide or another metal silicide.

DETAILED DESCRIPTION OF THE INVENTION

Figure 1:
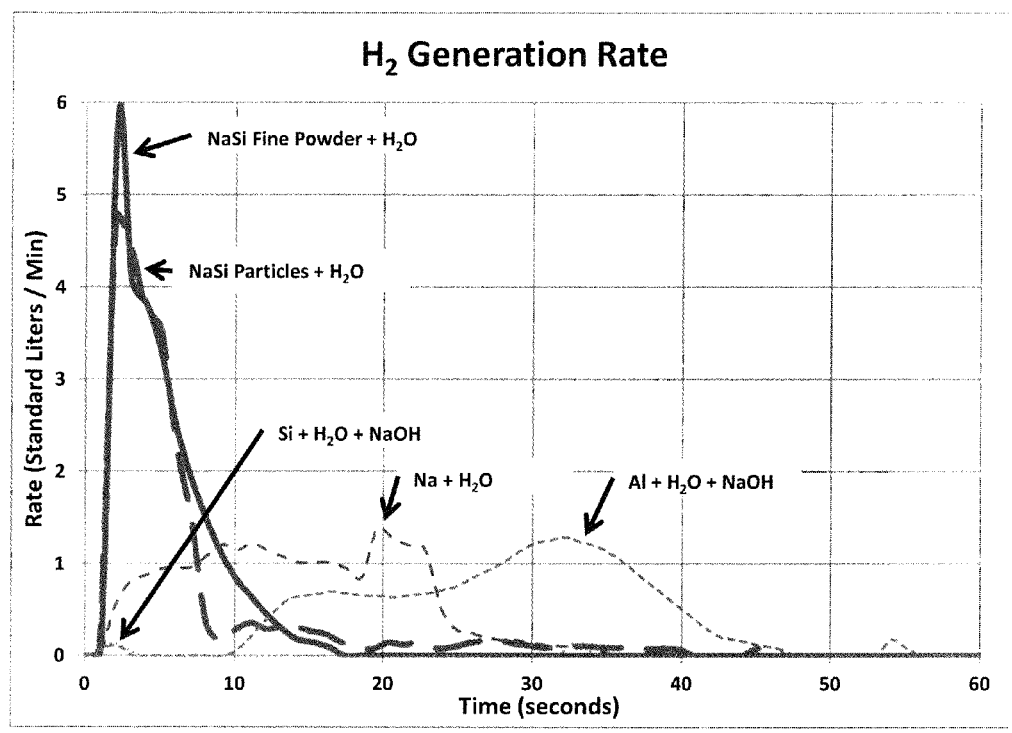
FIG. 1 displays the hydrogen gas generation rates for selected hydrogen generating chemical reactions.

A new and improved hydraulic fracturing method is provided based on the use of metal silicides. More specifically, metal silicide is used in a hydraulic fracturing process to react with water and create significant heat and gas volume leading to a rapid pressurization in a confined space that will enhance the hydraulic fracturing of subterranean hydrocarbon bearing formations and permit the recovery of hydrocarbon fluids. The metal silicide may be an alkali metal silicide or another metal silicide.

Additionally, a new and improved method for removing asphaltene or waxy buildup is also provided based on the use of metal silicide. More specifically, metal silicide is used to deliver heat and pressure in a controlled manner to remove buildup of materials in subsea pipelines. The metal silicide may be an alkali metal silicide or another metal silicide.

Alternatively, there is also provided a method for purifying flowback water produced from a hydraulic fracturing process comprising adding metal silicide to the flowback water produced from a hydraulic fracturing process. The metal silicide may be alkali metal silicide or another metal silicide.

Metal Silicides

Metal silicides are binary compounds of silicon with a metal element. In the preferred embodiment, alkali metal silicides are used in the present invention. Other metal silicides that can be used in the present invention include beryllium silicide (e.g., $Be_{2n}Si_n$), magnesium silicide (e.g., $Mg_2Si$), calcium silicide (e.g., $CaSi_2$), strontium silicide (e.g., $SrSi_2$), barium silicide (e.g., $BaSi_2$), radium silicide (e.g., $Ra_2Si$), boron silicide (e.g., $B_6Si$) or mixtures thereof.

Alkali metal silicides that are useful in the present invention include all alkal metal silicides. Alkali metal silicides that are preferred are lithium silicide (e.g., $Li_{12}Si_7$, $Li_6Si_2$), sodium silicide (e.g., $Na_4Si_4$, $Na_nSi_y$) and potassium silicide (e.g., $K_4Si_4$, $K_4Si$) and any others described in U.S. Pat. No. 7,811,541, Lefenfeld et al (issued Oct. 12, 2010) which is hereby incorporated by reference in its entirety for all purposes. Other useful alkali metal silicides include rubidium silicide (e.g., $Rb_4Si$) and cesium silicide (e.g., $Cs_4Si$). Alkali metal silicides may be prepared by mixing an alkali metal with powdered silicon in an inert atmosphere and heating the resulting mixture to a temperature below about 475° C. The resulting alkali metal silicide prepared in this manner does not react with dry $O_2$.

In one embodiment, the alkali metal silicide is a sodium silicide composition having a powder X-ray diffraction pattern comprising at least three peaks with 2Theta angles selected from about 18.2, 28.5, 29.5, 33.7, 41.2, 47.4, and 56.2. In another embodiment, the alkali metal silicide is a sodium silicide composition having a solid state $^{23}$Na Magic Angle Spinning (MAS) Nuclear Magnetic Resonance (NMR) spectra peak at about 18 ppm.

Sodium silicide and potassium silicide represent preferred alkali metal silicides for use in this invention. In one embodiment of the invention, the alkali metal silicide is a sodium silicide preferably having a 1:1 Na:Si molar ratio or a potassium silicide preferably having a 1:1 K:Si molar ratio. The sodium form may be preferred due to its lower raw material cost, and the potassium form may be preferred where layered swelling clays (montmorillonites, smectites, bentonite, illites, etc.) are present in the subterraneous formation since the potassium ion retards the expansion of the clay layers and the resultant swelling which can retard productivity.

Mixtures of metal and alkali metal silicides, as well as a mixture of two or more alkali metal silicides, may be used. For example, a mixed alkali metal silicide with a combination of alkali and/or other metals (e.g., Ca and Na; Na and K; Ca, Na, and K) can be used. The term alkali metal silicide includes mixed alkali metal silicides. Alternatively, mixtures of non-alkali metal silicides can also be used (e.g., Be and Mg; Ca and Mg; Ca and Sr, etc.)

Preferred alkali metal silicides are available from SiGNa Chemistry, Inc. of New York, N.Y. They are generally free-flowing granules or powders that may be easily handled in dry air. These alkali metal silicides do not react with oxygen and slowly absorb water from the atmosphere without ignition.

The size of the metal silicide particles can be reservoir-specific and based on a number of factors, including permeability of the reservoir materials. The size of the metal silicide (whether coated or uncoated) may be of the same order as the proppant itself (i.e., 10-200 mesh). The size of the metal silicide would be a factor in reaction rate and rate of pressure generation. Smaller sizes react faster and are easier to suspend in the hydrocarbon carrier fluid. The metal silicide may be an alkali metal silicide or another metal silicide.

Proppants

Proppants (i.e., propping agents) are essential and well known in hydraulic fracturing processes. Any conventional proppants can be used in the present invention, including those discussed in U.S. Pat. No. 6,169,058 to i.e., et al, issued Jan. 2, 2001 which is hereby incorporated by reference in its entirety. These proppants may be sand or other man-made sintered bauxite or other ceramic and/or glass materials with sufficient strength to hold the fractures open after the fracturing pressure has been withdrawn. Sand, sintered bauxite and other ceramic and/or glass proppants may also be coated with synthetic polymers and resins to improve strength and flow and to minimize flowback.

Proppants can also be used in combination with other materials such as gelled or thickened fluids including xanthan gum, guar, derivitized guar, cellulosics or derivitized cellulosics and with various ionic and nonionic polymer systems made from monomers including acrylamides, acrylic acids, vinyl pyrolidone, n-vinylacetamide, methylenebisacrylamide, dimethyldiallylammonium chloride, methacrylamidoethyltrimethylammonium, acrylamidomethylpropanesulfonic acid, maleic acid, itaconic acid, styrene sulfonic acid, vinylphosphonic acid, quaternary ammonium salt derivatives of acrylamide, quaternary ammonium salt derivatives of acrylic acid, or mixtures thereof to reduce fluid loss and to suspend the proppants. Additionally, various foamed fluid methods (U.S. Pat. No. 5,402,846, Jennings et al, Apr. 4, 1995, hereby incorporated by reference) as well as silicates with suitable gelling or precipitating agents (U.S. Pat. No. 3,097,694, Kerver, Jul. 16, 1963, hereby incorporated by reference) or colloidal silica (U.S. Pat. No. 7,111,683, Nelson, et al, issued Sep. 26, 2006, hereby incorporated by reference) can be used to create a cementing matrix with the proppants.

Proppants come in all sizes, and can range in size from 170 to 20 mesh. Additionally, proppants may be coated with a resin to improve roundness, strength and permeability and to help prevent flowback.

Hydrogen and Heat Generation

Metal silicides have been discovered to be useful for hydraulic fracturing and removal of buildup in subsea pipelines because they react very rapidly with water to generate significant amounts of hydrogen gas, heat, and the metal silicate byproduct. The metal silicide may be an alkali metal silicide or another metal silicide. The generation of hydrogen gas provides the excess pressure needed to create the fractures in the subterranean formation. The generation of heat helps to raise the temperature of the hydrocarbon fluid in the subterranean formation so as to reduce the viscosity of the hydrocarbon fluid (which will help it to flow). Additionally, the production of silicate is environmentally benign, and the alkaline environment (especially when alkali metal silicides are used) helps to reduce surface tension between the hydrocarbon fluid and the injected water. This combination of properties makes metal silicides well positioned to address a number of challenges related to the accessibility, production and transportation of hydrocarbon fluids such as crude oils and associated natural gas deposits.

For example, sodium silicide provides a very rapid chemical reaction with water to release hydrogen gas that can generate several thousand psi of pressure in a confined space. When using $Na_4Si_4$, the reaction is:

$$Na_4Si_4(s) + 10H_2O(\ell) \rightarrow 10H_2(g) + 2Na_2Si_2O_5(s) + \text{heat}$$
(1654 KJ/mol)

FIG. 1 demonstrates the rapid release of gas from a granular solid sodium silicide (>4750 μm), a powdered fine particle sized (<53 μm) sodium silicide and several other chemical methods to generate hydrogen gas. Regardless of particle size, the sodium silicide is completely reacted and all of the gas is released within about 20 seconds in the presence of greater than stoichiometric quantities of water. The maximum hydrogen generation rate was reached in about 2 seconds with 9.49 L/min/g being generated by the large particle sized silicide sample, and 11.7 L/min/g for the fine particle sized sample. By comparison, the maximum hydrogen generation rates for Na metal alone or Al metal in NaOH solution were only about a quarter of the hydrogen generation rate of sodium silicide with water. In addition, the maximum hydrogen generation rate using Na metal or Al metal in NaOH took up to 20 seconds to reach.

Figure 2:
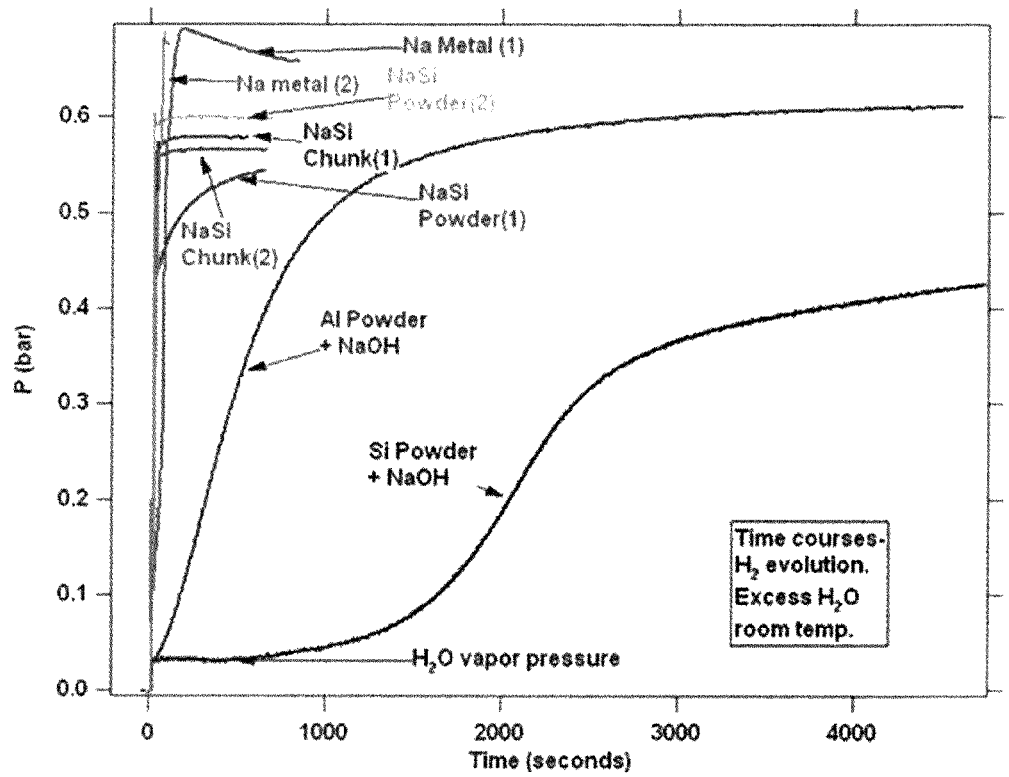
FIG. 2 displays the cumulative pressure generated from selected hydrogen generating chemical reactions.
Figure 3:
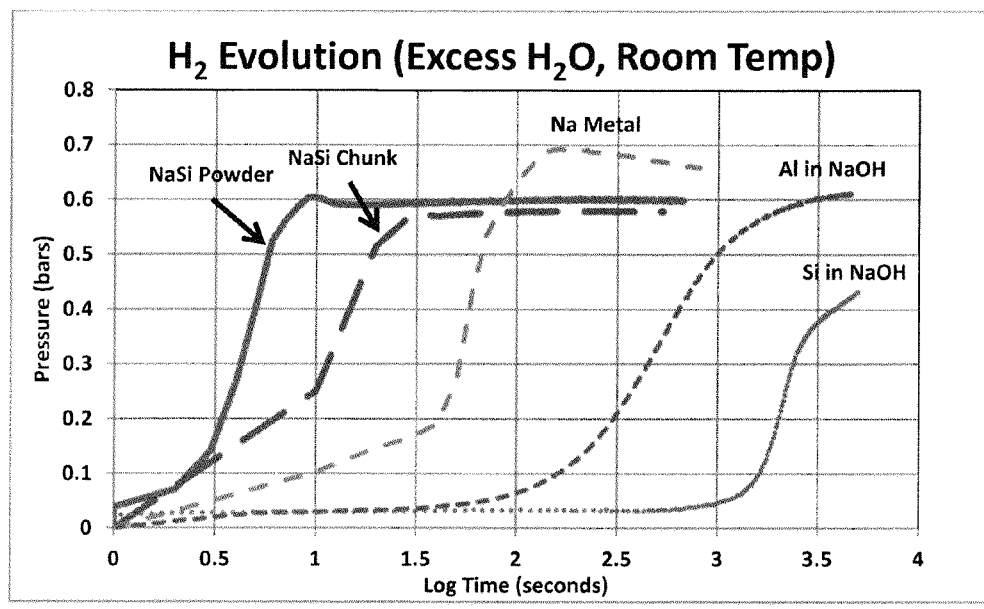
FIG. 3 displays the cumulative pressure generated from selected hydrogen generating chemical reactions, plotted on a log scale.

Furthermore, sodium silicide has been observed to generate pressures in excess of 10,000 psi (690 bar) in a closed environment. Pressure does not limit the reaction in excess water. FIG. 2 shows a small-scale pressure buildup for selected hydrogen-generating chemical methods. For each of these reactions sufficient solid reactants (<0.5 g) were used to generate from 0.014 to 0.016 g of hydrogen gas or roughly 0.6 bar of pressure. FIG. 2 shows that both sodium silicide and sodium metal are quite rapid to react whereas either Al or Si metal in NaOH are relatively slow as demonstrated by the estimated half times to react. FIG. 3 shows the same data as FIG. 2, but on a log scale to better illustrate the differences. The summary data for FIGS. 2 and 3 are shown in Table 1 below:

TABLE 1

Time-Courses of $H_2$ Production with Excess Room-Temperature Water

| Reactants and Run No. | Solid Mass (g) | Theoretical $H_2$ Mass (g) | $H_2$ Moles (n) | Final Pressure (bar) | Half-time (seconds) |
|---|---|---|---|---|---|
| Na (s) + $H_2O$ Run 1 | 0.327 | 0.0143 | 0.0071 | 0.658 | 50 |
| Na (s) + $H_2O$ Run 2 | 0.3284 | 0.0144 | 0.0071 | 0.676 | 19 |
| Al + $H_2O$ + NaOH | 0.1276 (Al) + .5593 (NaOH) | 0.0143 | 0.0071 | 0.61 | 480 |
| Si + $H_2O$ + NaOH | 0.1088 (Si) + 0.60 (NaOH) | 0.0156 | 0.0077 | 0.542 | 2300 |
| NaSi Powder + $H_2O$ (1) | 0.1663 | 0.0164 | 0.0081 | 0.544 | 3 |
| NaSi Powder + $H_2O$ (2) | 0.1678 | 0.0166 | 0.0082 | 0.599 | 4 |
| NaSi Chunk + $H_2O$ (1) | 0.1633 | 0.0161 | 0.0080 | 0.578 | 13 |
| NaSi Chunk + $H_2O$ (2) | 0.1664 | 0.0164 | 0.0081 | 0.565 | 5 |

As shown in both FIGS. 1-3, metal silicides such as alkali metal silicides can be useful in hydraulic fracturing because of their ability to react with water and produce significant amounts of pressure in a confined space. Initiating and propagating cracked fissures for hydraulic fracturing requires high pressure on the order of 0.3 to 2.0 psi per foot of reservoir depth. As such, metal silicides can be used in the hydraulic fracturing method of the present invention to generate pressure of at least 1,000 psig in the wellbore, or between 1,000 and 20,000 psig in the wellbore, or between 5,000 and 20,000 psig in the wellbore, or between 10,000 and 20,000 psig in the wellbore. The metal silicide may be an alkali metal silicide or another metal silicide.

Often there is a significant pressure drop as the cracks penetrate further and further into the formation and leak off can be a limiting factor. This can limit the aerial extent of the fracturing that occurs. Proper application of metal silicides such as sodium silicide with delayed reaction until near the tip of a propagating fracture can overcome these pressure and leak off losses to rapidly generate additional energy and pressure to propel proppants deeper into the formation.

As a result of its significant pressure generation when reacting with water, the use of metal silicides in a hydraulic fracturing process can save expenses by reducing the amount of pressure/energy or costly pumping equipment needed at the surface to conduct a hydraulic fracturing operation. This is especially true for small scale hydraulic fracturing operations where smaller amounts of pressure are needed to create/improve the flow of hydrocarbon fluids. For example using 2,500 pounds of sodium silicide generates over 47,000 $ft^3$ of gas at standard temperature and pressure, which is equivalent to generating 111 $ft^3$ at 10,000 psi and 200° C. heat downhole. In turn, this would be equivalent to a reduction of 350,000 gal of water at STP or 830 gal downhole. Final gas volumes and corresponding water reductions are proportional to the ultimate pressure and temperature downhole as per the ideal gas law (PV=nRT); hydrogen being an ideal gas.

Hydraulic Fracturing Process

The method of hydraulic fracturing of the present invention comprises injecting into a wellbore a fracturing fluid (comprising metal silicide in advance of, with or after proppant), and then subsequently injecting a reacting fluid (comprising water) into the wellbore to generate a pressure of at least 1,000 psig in the wellbore. Alternatively, the hydraulic fracturing method of the present invention will generate pressure of between 1,000 and 20,000 psig in the wellbore, or between 5,000 and 20,000 psig in the wellbore, or between 10,000 and 20,000 psig in the wellbore. As such, the hydraulic fracturing process might employ anywhere from a few hundred to several thousand pounds of metal silicide in advance of the proppant load or mixed in with the proppant load or after the proppant load. The metal silicide may be an alkali metal silicide or another metal silicide. For example, the hydraulic fracturing process might employ 200-5,000 (or 500-5,000 or 500-4,000 or 500-3,000 or 500-2,000 or 1,000-2,000) pounds of alkali metal silicide in advance of the proppant load or mixed in with the proppant load or after the proppant load.

While the silicide reaction can take place in various areas of the fracture zone (i.e., the wellbore and the formation) and generate pressure throughout the fracture zone, the resulting pressure increase in accordance with the present invention is measured in the wellbore. The resulting pressure increase is incremental to any being applied from the surface to initiate and propagate the fracture. Measuring the pressure in the wellbore can be done using any methods known in the art for measuring pressure in underground formations, such as the common and well known wireline or drill stem techniques. The pressure generated by the metal silicide reaction with water will be pressure over and above the natural reservoir pressure (e.g., the bottom hole pressure). As an example, natural reservoir pressure such as in shale gas formations is typically low since the formation is very tight and has low permeability, whereas pressure in a liquid hydrocarbon reservoir with an active gas cap and water drive may be quite high.

Many other embodiments of the hydraulic fracturing process in the present invention can be used, and may differ depending on whether the metal silicide is coated or uncoated, and/or whether the metal silicide is injected into the wellbore with the proppant, before the proppant, or after the proppant.

Yet other embodiments of the hydraulic fracturing process in the present invention can also differ depending on where and when the metal silicide reaction with water is desired to occur. For example, the metal silicide-water chemical reaction can be postponed until the reactants are placed deep into the formation where the reaction can overcome the pressure drop limitations imposed from the formation. The metal silicide can then be reacted by contact with water. This can be accomplished by injecting the metal silicide load in advance of, or mixed with, the proppant load. The metal silicide may be an alkali metal silicide or another metal silicide.

Further embodiments can employ methods to isolate the metal silicide during introduction into the well to prevent its premature reaction with water. For example, a dual string injection can be used with one string carrying the water and the other a light non-reacting hydrocarbon (such as mineral oil, diesel fuel, etc.) loaded with sodium silicide. Mixing and reaction would then commence at the exit point as the fluids intermingle.

Uncoated Metal Silicide Mixed with Proppant

In this embodiment, a method of hydraulic fracturing comprises injecting a fracturing fluid (comprising proppant, metal silicide and hydrocarbon fluid) into a wellbore, and injecting an aqueous fluid (comprising water) into the wellbore, wherein the metal silicide will react with the water to generate a pressure of at least 1,000 psig in the wellbore. Alternatively, the hydraulic fracturing method of the present invention will generate pressure of between 1,000 and 20,000 psig in the wellbore, or between 5,000 and 20,000 psig in the wellbore, or between 10,000 and 20,000 psig in the wellbore. The aqueous fluid can be injected either before or after the fracturing fluid. The metal silicide may be an alkali metal silicide or another metal silicide.

The fracturing fluid may comprise at least 10% proppant, at least 5% metal silicide and the remainder hydrocarbon fluid (with or without additives). Alternatively, the fracturing fluid may comprise 10-30% proppant, or 10-20% proppant, or 20-30% proppant, while also comprising any of 5-20% metal silicide, or 10-20% metal silicide or 15-20% metal silicide. The metal silicide may be an alkali metal silicide or another metal silicide. The hydrocarbon fluid may or may not contain any conventional additives known in the art such as friction reducers, guar gum, polymers, crosslinkers, surfactants, biocides, emulsion breakers and emulsifiers for use with hydraulic fracturing processes. Additionally, the hydrocarbon fluid may contain various surfactants or thickeners to enhance the foaming ability of the hydrogen gas generated, depending on whether foaming is desired.

The aqueous fluid comprises water, and may also contain any conventional additives known in the art such as friction reducers, guar gum, polymers, crosslinkers, surfactants, biocides, emulsion breakers and emulsifiers for use with hydraulic fracturing processes. For example, the aqueous fluid may also contain surfactants and thickeners to promote stable foams as well.

In this embodiment, the pressure generated by the reaction of metal silicide and water can be used to create or propagate the fractures and force the proppant deeper into the fractures. Such an objective would use an intermediate concentration metal silicide in comparison to other embodiments with different objectives.

Uncoated Metal Silicide Separate from the Proppant

In this embodiment, a method of hydraulic fracturing comprises injecting a metal silicide loaded fracturing fluid (comprising metal silicide and hydrocarbon fluid) into a wellbore; injecting a proppant loaded fracturing fluid (comprising proppant and hydrocarbon fluid) into the wellbore; and injecting an aqueous fluid (comprising water) into the wellbore, wherein the metal silicide reacts with the water to generate a pressure of at least 1,000 psig in the wellbore. Alternatively, the hydraulic fracturing method of the present invention will generate pressure of between 1,000 and 20,000 psig in the wellbore, or between 5,000 and 20,000 psig in the wellbore, or between 10,000 and 20,000 psig in the wellbore. The metal silicide loaded fracturing fluid may be injected before or after the proppant loaded fracturing fluid. The hydrocarbon fluid in the metal silicide loaded fracturing fluid and the proppant loaded fracturing fluid may be the same or different. The metal silicide may be an alkali metal silicide or another metal silicide.

In another alternative embodiment, a method of hydraulic fracturing comprises injecting a metal silicide loaded fracturing fluid (comprising metal silicide and hydrocarbon fluid) into a wellbore; injecting a spacer slug comprising hydrocarbon fluid; injecting a proppant loaded fracturing fluid (comprising proppant and water) into the wellbore; and injecting an aqueous fluid (comprising water) into the wellbore, wherein the spacer slug is injected in between the metal silicide loaded fracturing fluid and the proppant loaded fracturing fluid, and wherein the metal silicide reacts with water to generate a pressure of at least 1,000 psig in the wellbore. Alternatively, the hydraulic fracturing method of the present invention will generate pressure of between 1,000 and 20,000 psig in the wellbore, or between 5,000 and 20,000 psig in the wellbore, or between 10,000 and 20,000 psig in the wellbore. The metal silicide loaded fracturing fluid may be injected before or after the proppant loaded fracturing fluid. The hydrocarbon spacer slug is used in between the metal silicide loaded fracturing fluid and the proppant loaded fracturing fluid to prevent the reaction until some distance into the fracture. The hydrocarbon spacer slug may contain the same or a different hydrocarbon fluid from the metal silicide loaded fracturing fluid. The metal silicide may be an alkali metal silicide or another metal silicide.

The metal silicide loaded fracturing fluid may comprise at least 20% metal silicide and the remainder hydrocarbon fluid (with or without additives). Alternatively, the metal silicide loaded fracturing fluid may comprise 20-50%, or 20-40%, 20-30%, 30-50%, 30-40%, or 40-50% metal silicide. The metal silicide may be an alkali metal silicide or another metal silicide. The hydrocarbon fluid may or may not contain any conventional additives known in the art such as friction reducers, guar gum, polymers, crosslinkers, surfactants, biocides, emulsion breakers and emulsifiers for use with hydraulic fracturing processes. For example, the hydrocarbon fluid may contain various surfactants or thickeners to enhance the foaming ability of the hydrogen gas generated, depending on whether foaming is desired.

The proppant loaded fracturing fluid may comprise at least 10% proppant. Alternatively, the proppant loaded fluid may comprise 10-30%, 10-20% or 20-30% proppant. The hydrocarbon fluid (or water) may or may not contain any conventional additives known in the art such as friction reducers, guar gum, polymers, crosslinkers, surfactants, biocides, emulsion breakers and emulsifiers for use with hydraulic fracturing processes. For example, the hydrocarbon fluid may contain various surfactants or thickeners to enhance the foaming ability of the hydrogen gas generated, depending on whether foaming is desired.

The aqueous fluid comprises water, and may also contain any conventional additives known in the art such as friction reducers, guar gum, polymers, crosslinkers, surfactants, biocides, emulsion breakers and emulsifiers for use with hydraulic fracturing processes. For example, the reacting fluid may also contain surfactants and thickeners to promote stable foams as well.

The decision to inject the metal silicide before or after the proppant can depend on the objective of the operation. For example, the use of a larger amount of silicide in advance of the proppant may be used to better extend and propagate the fractures. Alternatively, the use of silicide after the proppant may be used to better push the proppant into the fractures.

Coated Metal Silicide

In yet another embodiment, the metal silicide may be coated (i.e., encapsulated) with a water insoluble, or slowly dissolving, coating in order to prevent premature reaction with water, or in order to inject the metal silicide into the wellbore with water (instead of a hydrocarbon fluid). The metal silicide may be an alkali metal silicide or another metal silicide. Furthermore, coatings can be designed to delay and control the metal silicide reaction with water until the metal silicide reaches a particular location within the wellbore or the formation where its reaction with water can provide the maximum pressure/heat benefit.

Alternatively, the metal silicide can be encapsulated in a material (such as various thermo-melt waxes of a paraffin or microcrystalline nature, or beeswax or degradable polymer coatings) that will prevent reaction with water until an activator is provided. Paraffin microcrystalline and beeswaxes, depending upon molecular weight distribution, melt once a specific temperature is reached or exceeded. Therefore an appropriately selected wax coating can be designed to melt upon placement at reservoir temperatures or by a chaser slug of steam/hot water which would melt the wax and react with the sodium silicide. Similarly, polymer coatings can be designed which are dissolved via an appropriate solvent or by reservoir fluids. Such a solvent can be injected as a chaser fluid to the coated silicide load and designed to mix deep in the formation and dissolve the coating to allow reaction with release of heat and gas. Waxes are preferred since initial reaction of a portion of the injected silicide solids will provide sufficient heat to melt subsequent wax and release all remaining material in rapid fashion.

Additional thermal-controlled-melt waxes or crystallizable or thermoplastic polymers that can be used to coat/encapsulate the metal silicide include those disclosed in U.S. Pat. No. 6,224,793 to Dwight K. Hoffman, issued May 1, 2001, herein incorporated by reference. For example useful thermoplastic or crystallizable polymers can have a transition point or melting point from about 40° C. to about 250° C., or 40° C. to 200° C., or 50° C. to 100° C. Useful thermoplastic polymers include styrenics, styrene acrylonitriles, low molecular weight chlorinated polyethylenes, soluble cellulosics, acrylics, such as those based on methyl methacrylate or cycloaliphatic acrylates. Useful crystalline polymers include polyolefin, polyester, polyamide, phenoxy thermoplastic, polylactic acid, polyether, polyalkylene glycol or a side chain crystallizable polymer, polyethylene, polypropylene, polyether, polyethylene glycol, phenoxy thermoplastic, polylactic acid or side chain crystallizable polymer.

Such coating/encapsulating materials can also be designed and tailored to the particular reservoir temperature so that softening and coating breakdown is naturally triggered upon reaching temperature at reservoir depth. In other words, the water insoluble coating can be designed to have a melting point just above the natural reservoir temperature so that a follow on shot of fluid at sufficient temperature triggers the breakdown. Once some of the injected metal silicide begins to react with water, the heat generated should subsequently degrade the remaining wax coating and release the remainder of the silicide for reaction with water.

Additional examples of coatings that can be used to coat/encapsulate metal silicides include biodegradable plastics (e.g., plastics that are broken down by microbes) such as hydro-biodegradable plastics (HBP) or oxo-biodegradable plastics (OBP). A polyester coating is one example of an HBP that has a hydrolysable ester bond. An example of an OBP type coating includes plastics such as polyethylene (PE), polypropylene (PP) and polystyrene (PS) that further contain a small amount of a transition metal such as iron, manganese, cobalt or nickel to speed up the biodegradation of the plastic. An OBP is a longer term form of protection since the degradation rate is less than an HBP by roughly a factor of 10. Reservoirs have a variety of in situ microbes or specific non-native microbes can be injected to facilitate the coating degradation. The microbes can be stimulated by addition of nutrients and/or oxygen to degrade the coatings.

Further, various plastic coatings can be softened or swelled upon contact with solvents such as alcohols, acetone, gasoline, lighter hydrocarbon fractions or any other conventional solvents known in the art for dissolving coatings. These solvents may be present either in the native crude or can be injected subsequent to the coated silicide application to release and promote the reaction with water.

As such, in one embodiment, a method of hydraulic fracturing comprises injecting a fracturing fluid (comprising proppant, metal silicide composition comprising metal silicide encapsulated in a water insoluble coating, and carrier fluid) into a wellbore, and injecting a reacting fluid into the wellbore to remove the water insoluble coating on the metal silicide composition and react with the metal silicide to generate a pressure of at least 1,000 psig in the wellbore. Alternatively, the hydraulic fracturing method of the present invention will generate pressure of between 1,000 and 20,000 psig in the wellbore, or between 5,000 and 20,000 psig in the wellbore, or between 10,000 and 20,000 psig in the wellbore. The metal silicide may be an alkali metal silicide or another metal silicide.

The fracturing fluid may comprise at least 10% proppant, at least 5% metal silicide composition and the remainder carrier fluid (with or without additives). Alternatively, the fracturing fluid may comprise 10-30% proppant, or 10-20% proppant, or 20-30% proppant, while also comprising any of 5-20% metal silicide composition, or 10-20% metal silicide composition or 15-20% metal silicide composition. The metal silicide composition is comprised of metal silicide encapsulated in a water insoluble coating such as a wax coating or any polymer coating known in the art such as polystyrene, polypropylene, polyethylene and those discussed in the previous paragraphs. The metal silicide may be an alkali metal silicide or another metal silicide. The carrier fluid may be water, or any hydrocarbon fluid known in the art, and may or may not contain any conventional additives known in the art such as friction reducers, guar gum, polymers, crosslinkers, surfactants, biocides, emulsion breakers and emulsifiers for use with hydraulic fracturing processes, including various surfactants or thickeners to enhance the foaming ability of the hydrogen gas generated, depending on whether foaming is desired.

If the water insoluble coating is a wax coating, then the reacting fluid comprises hot water or steam, and is of a temperature greater than the melting point of the water soluble coating. Alternatively, if the natural formation temperature is greater than the melting point of the water insoluble coating, then the reacting fluid may be of a temperature less than the melting point of the water soluble coating since once some wax coating melts due to the higher natural formation temperature, the metal silicide will begin reacting with water to generate heat and melt the wax coating on the remaining metal silicides.

Alternatively, if the water insoluble coating is a degradable polymer coating, then the reacting fluid comprises a solvent that will dissolve the water insoluble coating. For example, the degradable polymer coating may be various polyurethanes and the solvent may be toluene, other aromatic hydrocarbons or ketones.

The reacting fluid may also contain any conventional additives known in the art such as friction reducers, guar gum, polymers, crosslinkers, surfactants, biocides, emulsion breakers and emulsifiers for use with hydraulic fracturing processes. For example, the reacting fluid may also contain surfactants and thickeners to promote stable foams as well.

Surfactants

Any of the fracturing fluid and/or the reacting fluid of the present invention may further contain surfactants such as various ionic (such as alpha-olefin sulphonic acids or ethoxylated alcohol sulfonates) or non-ionic soaps (such as various sugar derivative esters) and polymers such as guar or xanthan gums to form stable viscous foams with the resulting hydrogen gas, similar to how $CO_2$ and $N_2$ are used in foamed hydraulic fracturing. Thus, in a hydraulic fracturing process that include surfactants and polymers in a delayed/controlled reaction between the alkali metal silicide and water, the foams would form in situ deep into the fractures to provide improved and extended transport of proppants while functioning as a thickened liquid close to the wellbore to avoid leak off loses. Hence, as with previous foamed hydraulic fracturing processes, the use of surfactants in the hydraulic fracturing process of the present invention can help reduce water usage by substituting the resulting hydrogen gas for a portion of the required water.

Spacer Slugs

In a further method of the invention, the sodium silicate can be dispersed in a non-reactive organic carrier fluid and be further separated from a subsequent water slug by a short organic spacer slug, devoid of silicide. The organic spacer slug can be of sufficient size to result in dispersive contact at a desired depth into the formation during the fracturing process. Non-reactive organic fluids may comprise any inexpensive, readily-available oil such as a mineral oil or diesel fuel or even dewatered native reservoir hydrocarbons. Regardless of the non-reactive fluids, this rapid reaction of silicide with water generates significant hydrogen gas and heat to overcome the pressure drop limitations of the surface equipment and thereby extend the fracturing of the formation. The rapid reaction is a function of the silicide particle size, with smaller particles providing greater surface area for contact with water and reaction. Also, when metal silicide is an alkali metal silicide, the resultant end product is an alkaline 2.0 ratio alkali metal silicate that can extend the lubricity of the fracturing fluids. Alkaline fluids have a slippery or slick feel to the touch that should aid in fracturing.

Silicate Byproduct

As discussed above, the reaction of the metal silicide yields heat, hydrogen gas and metal silicates. Both of these reaction end products (hydrogen or metal silicate) are environmentally benign, which helps to address environmental concerns in many areas of the world.

Additionally, the resulting metal silicate byproduct such as sodium disilicate may be a viscosifying agent (i.e. imparts viscosity and suspension properties) at high concentrations to assist in proppant transport and the reduction of fluid losses. Even at low concentrations, the metal silicate byproduct can be gelled with borates, or other suitable gelling agents including strong acids of hydrochloric, sulfuric, nitric; weak acids of acetic, formic, propionic; ammonium salts and silicofluorides; aldehydes of formaldehyde, glyoxal, benzaldehyde; polyhydric alcohols of ethyleneglycol, dextrin, glycerin, starches and sugars or precipitating agents including various multivalent cation salts of calcium, magnesium, aluminum of a chloride, bicarbonate, carbonate, hydroxide sulfate, phosphate, or nitrate as well as Portland and microfine cements and pozzolans and natural materials such as fly ash, clay, sulfur, gypsum to help cement the proppant bed and reduce flow back. These and other gelation agents/techniques such as those disclosed in Vytautas Usaitis, *Master's Thesis: Laboratory Evaluation of Sodium Silicate for Zonal Isolation*, Faculty of Science and Technology, University of Stavanger, Jun. 30, 2011 (herein incorporated by reference) and P. H. Krumine and S. D. Boyce, *Profile Modification and Water Control With Silica Gel-Based Systems*, Society of Petroleum Engineers SPE 13578 (1985)(herein incorporated by reference) can be used. Also, various organic setting agents that can be used include ethyl acetate, dibasic ester, monacetin, triacetin, terraset, propylene carbonate, diacetic, etc.

There are many additives and techniques known in the art to gel a metal silicate in the wellbore such as those disclosed in Hower and J. Ramos, "Selective Plugging of Injection Wells by In Situ Reactions," API Paper No. 754-G (1955); R. F. Rensvold, H. J. Ayres, and W. C. Carlisle, "Completion of Wells to Improve Water-Oil Ratios," Paper No. SPE 5379 presented at the 1975 California Regional Meeting of the Society of Petroleum Engineers of AIME, Ventura, Calif. (1975); John. K. Borchardt, "In-situ gelation of silicates in drilling, well completion and oil production," Colloids and Surfaces, 63 (1992) 189; U.S. Pat. No. 7,926,567 to Ralph Edmund Harris, Ian Donald McKay (Issue date Apr. 19, 2011), all of which are hereby incorporated by reference.

The gels may be elastic or rigid based on process parameters such as silicate concentration and type of gelling agent, pH, temperature, water hardness and the presence of oil phases. The silicate gels are effective at temperatures ranging from 40° F. to 350° F., and the gelation times can be varied from a few seconds to over 400 hours.

There are numerous studies showing that silicates react with and precipitate multi-valent cations such as Ca, Mg, Fe, Al, Cr, Ba, Sr, Ra, etc. to reduce their activity in solution. In one example a fresh water source and flowback stimulation water was found to contain the following:

TABLE 2

| Chem Symb | Element | in ppm | | | | in ppm | | |
|---|---|---|---|---|---|---|---|---|
| | | Fresh Water | Flowback Water | After Add NaSi | % Inc/Dec | 50/50 Water | After Add NaSi | % Inc/Dec |
| Na | Sodium | 150 | 17000 | 30000 | 76% | 8575 | 18000 | 110% |
| K | Potassium | 2.4 | 190 | 460 | 142% | 96.2 | 190 | 98% |
| Ba | Barium | 0.76 | 760 | 90 | −88% | 380.38 | 4 | −99% |
| Ca | Calcium | 9.6 | 4500 | 140 | −97% | 2254.8 | 4.1 | −100% |
| Fe | Iron | 0 | 60 | 0 | −100% | 30 | 0.1 | −100% |
| Sr | Strontium | 0.6 | 770 | 200 | −74% | 385.3 | 7.4 | −98% |
| Mg | Magnesium | 7.5 | 500 | 1.3 | −100% | 253.75 | 0.66 | −100% |
| Al | Aluminum | 0 | 0 | 0 | — | 0 | 0.3 | — |
| Mn | Manganese | 0 | 2.5 | 0 | −100% | 1.25 | 0 | −100% |
| Cr | Chromium | 0 | 0 | 0 | — | 0 | 0 | — |
| Co | Cobalt | 0 | 0 | 0 | — | 0 | 0 | — |
| Si | Silicon | 2.7 | 17 | 150 | 780% | 9.85 | 3272 | 33119% |
| Total | | 174 | 23800 | 31041 | | 11987 | 21479 | |

Also a 50/50 mixture of the fresh and recycle flowback water was prepared for testing. Upon addition of 2 gm of silicide to 100 ml of this flow back water, considerable solid precipitates were observed to form which amounted to more than three grams of solids when filtered off and resulted in reduction of the multivalent cations by at least 74% up to 100% depending on whether silicate was the limiting factor. Higher reductions were observed in the 50/50 mixture of flowback and fresh waters which were not silicate limited. Therefore, the presence of silicates from the reaction of the alkali metal silicides in the fracturing fluid even at low concentrations will retard these ions from coming into solution and significantly reduce the presence of these ions in the flowback waters. For example, the method of the present invention can result in greater than 70% reduction of multivalent cations in the flow back water, or between 75-100% or 80-90% reduction of multivalent cations in the flow back water. Thus, the production of alkali metal silicate byproducts will simplify the treatment/disposal or recycling of the flowback waters once produced back to the surface.

Alternatively, there is also provided a method for purifying flowback water produced from a hydraulic fracturing process comprising adding metal silicide to the flowback water produced from a hydraulic fracturing process. The metal silicide may be alkali metal silicide or another metal silicide. The metal silicide may be added in sufficient amount to reduce the concentration of multivalent cations in the flowback water by greater than 70%, or reduce the concentration of multivalent cations by 75-100% or 80-90%.

Other Hydraulic Fracturing Processes

In another example small scale stimulation embodiment requiring minimal high pressure surface pumping equipment, a similar or larger quantity of metal silicide could be deposited in the basement area (below the production zone) of a properly cased, perforated and prepared vertical well to be fractured. The metal silicide may be an alkali metal silicide or another metal silicide. For example, using 12 inch pipe and 35 ft of basement below the wellbore filled with sodium silicide granules (~1.7 g/cc) in a hydrocarbon fluid will provide a roughly 2500 lb charge. Above this silicide charge the proppant can be placed in the productive zone of the well where the well casing has been previously perforated. Above that could be a packer designed to withstand the expected pressure for the depth of formation. All that is then required is to introduce water to begin the reaction. The water (surfactant and polymer solution) can be introduced directly into the basement area to displace the light hydrocarbon, which will produce a rapid reaction and buildup of pressure. Alternatively, the water (surfactant and polymer solution) can be introduced above the basement area and allowed to trickle down, displacing the light hydrocarbon to provide a more gradual and controlled pressure buildup. As the silicide reaction proceeds to evolve hydrogen gas, the proppant load will be fluidized and flushed into the fractured formation by the gas and foam. This approach will only be limited by the amount and size of the basement area below the production zone, but will require minimal surface equipment (compared to a conventional stimulation job) to charge and initiate the reaction.

In addition, metal silicides can be useful in multi-stage fracturing processes. The metal silicide may be an alkali metal silicide or another metal silicide. Horizontal drilling technology along with multi-stage hydraulic fracturing has opened up a number of previously uneconomic hydrocarbon rich formations to commercial production. For example, directional drilling has allowed long horizontal laterals (up to several miles) to be drilled into hydrocarbon rich pay zones providing access to larger cross sections of the reservoir via a single well, which minimizes the surface disturbance and infrastructure. These long laterals are candidates for multi-stage fracturing applications where short segments of the well lateral are perforated, isolated via packers and individually fractured as the injection string is withdrawn from the well in stages. Thus, based on the teachings herein, one skilled in the art will appreciate that alkali metal silicides can also be used in a multi-stage fracturing operation by employing any of the various embodiments of the hydraulic fracturing process of the present invention.

Additionally, one skilled in the art will also appreciate based on the teachings herein that the rapid reaction mechanism of metal silicides with water can also be used in a controlled pulse fracturing process (U.S. Pat. No. 4,718,490, Uhri, Jan. 12, 1988, hereby incorporated by reference) to produce secondary fractures at specific points in the fracturing process via timed/controlled release of the hydrogen. The metal silicide may be an alkali metal silicide or another metal silicide.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention.

Dispersion of Waxy or Asphaltene Deposits in Subsea Tubulars and/or Other Pipelines Metal silicides can also be used to remove waxy or asphaltene buildup in tubulars or pipeline structures, such as subsea pipelines, wellbores or cross country pipelines or any other pipelines in which there is waxy or asphaltene buildup. The metal silicide may be an alkali metal silicide or another metal silicide. For example, waxes and asphaltene fractions may deposit out of the solution into the pipeline where there is a temperature drop or in colder temperatures (e.g., less than 40° F., between 20-40° F., between 30-40° F., etc.) or in locations where the pipeline may be difficult to reach. In the method of the present invention, the heat generated from the reaction of metal silicide with water can be used to melt/dissolve waxes and asphaltenes back into solution.

As such, the basic process of the present invention would be to inject alternating slugs of metal silicide dispersed in an organic carrier liquid such as a hydrocarbon fluid and then slugs of water to react and release heat as the two slugs begin to intermingle via dispersive flow in the pipeline. The metal silicide may be an alkali metal silicide or another metal silicide. The organic carrier fluid can be selected from various light hydrocarbons to further aide in the solubilization of the asphaltenes, or the native crude can be employed. If the distance and required reaction delay is significant, then spacer slugs of pure hydrocarbon can be employed between the water and loaded metal silicide slugs to slow the dispersive mixing, and thereby delay reaction and heat release.

In addition to heat, the reaction of metal silicide with water also releases hydrogen gas and creates an alkaline environment (especially when alkali metal silicides are used) to facilitate the removal of these deposits. The alkaline environment promotes saponification of any acidic components in the waxy deposits and emulsification to aide in the release and transport. The hydrogen gas creates pressure to help force the hot fluids through the pipeline to the point of constriction. Neither the heat, nor the pressure, nor the residence time, nor the hydrogen gas generated is sufficient to promote significant hydrogenation of the asphaltene deposits. The amount of heat and hydrogen released will depend on the loading of metal silicide in the organic carrier fluid, while dispersion in the carrier and reaction rate depend on the particle size of the metal silicide.

Figure 4:
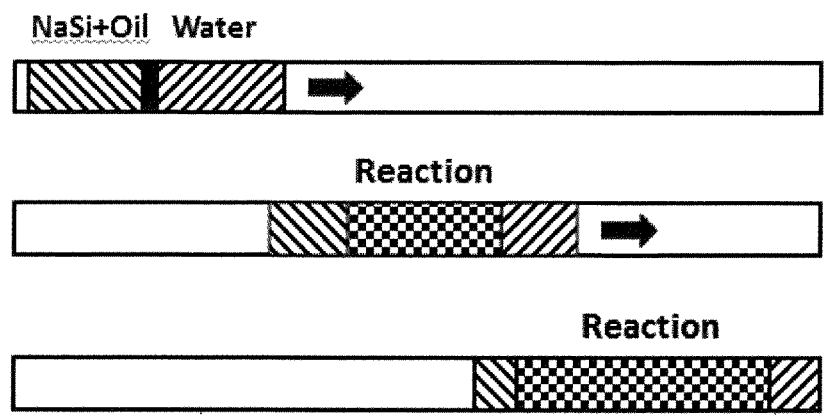
FIG. 4 displays an embodiment of the method of removing deposits in subsea pipelines in accordance with the present invention where the two slugs intermingle to create a hot pressured reaction zone at some distance into the pipeline.

In one embodiment, the method for removing buildup of waxy or asphaltene deposits in a pipeline (such as a subsea pipeline) comprises injecting an organic slug (comprising metal silicide and hydrocarbon fluid) into the pipeline, injecting an aqueous slug (comprising water) into the pipeline, wherein said metal silicide reacts with said water in said pipeline to generate heat and pressure for removing (in any amount) the buildup of asphaltene or waxy deposit. The metal silicide may be an alkali metal silicide or another metal silicide. Either the organic slug or the aqueous slug can be injected first. An illustration of this embodiment is shown in FIG. 4.

Alternatively, the method for removing waxy or asphaltene deposits in a pipeline (such as a subsea pipeline) comprises injecting an organic slug (comprising metal silicide and hydrocarbon fluid) and an aqueous slug (comprising water) into the pipeline on an alternating basis wherein the water will react with the metal silicide in the pipeline to generate heat and pressure for removing (in any amount) the buildup of asphaltene or waxy deposit. The metal silicide may be an alkali metal silicide or another metal silicide.

In yet another embodiment, the method of removing waxy or asphaltene deposits in a pipeline (such as a subsea pipeline) comprises injecting an organic slug (comprising metal silicide and hydrocarbon fluid), injecting a spacer slug (comprising hydrocarbon fluid), injecting an aqueous slug (comprising water) into the pipeline, wherein said metal silicide reacts with said water in said pipeline to generate heat and pressure for removing (in any amount) the buildup of asphaltene or waxy deposit. The metal silicide may be an alkali metal silicide or another metal silicide. The aqueous slug can be injected before or after the organic slug. The spacer slug is injected in between the aqueous slug and the organic slug. In other words, the order of which slug (aqueous vs. organic) is not important since they are separated by a spacer slug. The length of the spacer slug will determine how quickly (at what point in the pipeline) the alkali metal silicide and the water will intermingle to react and release heat to solubilize and dislodge the deposits thereby minimizing heat loss in transit. This embodiment is particularly useful in conditions where the subsea heat loss through the pipe walls is significant since it would be possible to release the heat at the point it is needed and avoid the heat losses during transit.

The organic slug may comprise at least 10% metal silicide, or 10-40%, 20-40%, 30-40%, 10-20%, 10-30% or 20-30% metal silicide. The metal silicide may be an alkali metal silicide or another metal silicide. By way of example, loadings of 20-40% alkali metal silicide with ~100 micron average particle size employing up to 10 pounds of sodium silicide per slug will generate roughly 35,000 BTU of heat and 200 ft$^3$ of gas.

The aqueous slug can be just water or it can contain any conventional additives known in the art. The spacer slug can be just hydrocarbon or it can contain any conventional additives known in the art to help solubilize the waxes and asphaltene fractions.

Additionally, a foaming agent can be included in any of the slugs to further help flush the waxy blockage through to the onshore facility Furthermore, a pig can also be used to separate or in between the metal silicide loaded organic and aqueous slugs. That is, in any of the embodiments above, after the injection of the organic slug containing the metal silicide (and before the injection of the aqueous slug), a pig would be inserted into and flow down the pipe until it hits a restriction due to asphaltene or waxy buildup. The metal silicide may be an alkali metal silicide or another metal silicide. The pig may incorporate a pressure relief valve so that any increase in pressure due to the restriction would release the water in the slug behind the pig to flow through and begin reacting with the metal silicide ahead of it and thereby dissolve the waxy/asphaltene buildup and flush the pipe clean. The pig could then resume flow to be retrieved at the onshore outlet of the pipe system. Such a pig might include various mechanical means like a wire brush to further clean the pipe once the alkali metal silicide/water reaction has taken place ahead of it.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention.

What is claimed is:

1. A method for purifying flowback water produced from a hydraulic fracturing process comprising:
    adding metal silicide to flowback water produced from a hydraulic fracturing process, wherein the flowback water comprises total suspended solids and total dissolved solids with multivalent cations;
    reacting said metal silicide with said flowback water thereby generating a metal silicate, wherein the metal silicate purifies the flowback water by reducing the concentration of multivalent cations in the flowback water.

2. The method of claim 1, wherein said metal silicide is an alkali metal silicide.

3. The method of claim 1, wherein said metal silicide is beryllium silicide, magnesium silicide, calcium silicide, strontium silicide, barium silicide, radium silicide, boron silicide or mixtures thereof.

4. The method of claim 1, wherein said metal silicide is added in an amount sufficient to reduce the concentration of multivalent cations in the flowback water by greater than 70%.

* * * * *